UNITED STATES PATENT OFFICE.

JOHN B. RUSSELL, OF DETROIT, MICHIGAN.

PURIFYING PEPSIN BY DIALYSIS.

SPECIFICATION forming part of Letters Patent No. 414,591, dated November 5, 1889.

Application filed April 24, 1889. Serial No. 308,431. (No specimens.)

*To all whom it may concern:*

Be it known that I, JOHN B. RUSSELL, of Detroit, in the county of Wayne and State of Michigan, have invented a new and useful Improvement in Manufacture of Pepsin, of which the following is a specification.

My invention consists in an improvement in the manufacture of pepsin, hereinafter fully described and claimed.

Pepsin is now usually obtained from the stomachs of hogs in two ways, viz: first, by scraping the mucus from the membranes of the stomach and drying it, and, second, by macerating the mucous membranes or whole stomachs, sometimes after having been cut or broken finely, in acidulated water, either cold or warm, (heat hastening the process,) whereby the pepsin is principally liberated from the peptic glands by its solvent or digestive action. The solution resulting from maceration may be treated in various ways. A portion of the ferment may be precipitated by adding to the solution some substance—such as common salt—and then the precipitate is collected and dried; or the solution may be clarified in other known ways and then evaporated to dryness.

My invention relates to this second mode of obtaining pepsin. In this mode, the pepsin being liberated by its solvent or digestive action on the membrane or glands, (except the small portion which may be held on the surface of the membrane,) the resulting solution, when strained and freed from fats and other undissolved matter, contains a mixture of pepsin, peptone, and such soluble salts as are liberated during the maceration.

Peptone or digested albuminous matter is in itself inert as a ferment, and whenever a peptone is capable of digestive action on albumen this is due to a mixture with the peptone of pepsin or some other digestive ferment. It follows that the digestive power of a mixture of pepsin and peptone depends upon the percentage of pepsin present, and is weakened by any increase in the percentage of peptone, and this accounts for the low digestive power of a pepsin obtained by dissolving the whole membrane or stomach, clarifying or purifying the solution, and then evaporating the solution to dryness.

Inasmuch as it is impossible to obtain pepsin by the second mode, no matter how conducted, free from peptone, and as the percentage of peptone increases with the extent to which the maceration or digestion is carried, it becomes necessary to reduce the percentage of peptone in the mixture in order to obtain pepsin of high digestive power. Pepsin, particularly in the presence of free acid, passes through parchment paper or animal membranes very slowly, while peptone and the soluble salts liberated from the stomach during maceration pass through these substances with comparative rapidity. I therefore place the solution obtained by maceration and clarification, as above described, containing pepsin, peptone, and usually some soluble salts, in a dialyser of any known form of construction, using for manufacturing a dialyser having large surfaces of parchment paper or animal membrane, by which a large quantity of material can be worked at once.

During the process of dialysis I keep the solution somewhat acid, adding hydrochloric or other suitable acid in small quantities whenever the solution approaches a neutral condition, and continue the process until the percentage of peptone is so reduced as to give a mixture of pepsin and peptone of the digestive power wished, (at present about one thousand to two thousand, in accordance with the United States Pharmacopœia test, Sixth Decennial Revision, 1870,) when I remove the solution from the dialyser and evaporate it to dryness.

What I claim as my invention, and desire to secure by Letters Patent, is—

The herein-described process of manufacturing pepsin, consisting in macerating hogs' stomachs in acidulated water, either hot or cold, clarifying the resulting solution in any known way, subjecting the clarified solution to dialysis, whereby the percentage of peptone present is reduced, and finally evaporating the moisture from the remainder of the solution.

JOHN B. RUSSELL.

Witnesses:
GEO. H. LOTHROP,
ADELAIDE A. ANDERSON.